US009735562B2

(12) United States Patent
Lallouet et al.

(10) Patent No.: US 9,735,562 B2
(45) Date of Patent: Aug. 15, 2017

(54) TERMINATION UNIT FOR A SUPERCONDUCTING CABLE

(71) Applicant: NEXANS, Paris (FR)

(72) Inventors: Nicolas Lallouet, Fiennes (FR); Sebastien Delplace, Loon-Plage (FR); Mark Stemmle, Hannover (DE); Erik Marzahn, Langenhagen (DE)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 15/045,481

(22) Filed: Feb. 17, 2016

(65) Prior Publication Data

US 2016/0261103 A1    Sep. 8, 2016

(30) Foreign Application Priority Data

Mar. 5, 2015  (EP) ..................................... 15305338

(51) Int. Cl.
| | |
|---|---|
| *H02G 15/34* | (2006.01) |
| *H01R 13/05* | (2006.01) |
| *H01R 24/66* | (2011.01) |
| *H02G 15/076* | (2006.01) |

(52) U.S. Cl.
CPC ............ *H02G 15/34* (2013.01); *H01R 13/05* (2013.01); *H01R 24/66* (2013.01); *H02G 15/076* (2013.01); *Y02E 40/648* (2013.01)

(58) Field of Classification Search
None
See application file for complete search history.

(56) References Cited

U.S. PATENT DOCUMENTS

| | | | |
|---|---|---|---|
| 8,624,109 B2* | 1/2014 | Traeholt ................. | H02G 15/34 174/125.1 |
| 2004/0211586 A1 | 10/2004 | Sinha et al. | |
| 2007/0137881 A1* | 6/2007 | Ashibe ..................... | H01R 4/68 174/125.1 |
| 2014/0135222 A1 | 5/2014 | Traeholt et al. | |

FOREIGN PATENT DOCUMENTS

JP      2005237062      9/2005

OTHER PUBLICATIONS

Search Report dated 2015.

* cited by examiner

*Primary Examiner* — Dimary Lopez Cruz
(74) *Attorney, Agent, or Firm* — Sofer & Haroun, LLP

(57) ABSTRACT

A termination unit (1) for a superconducting cable (3), has an internal electrically insulating envelope (2) containing the phase conductors (3A, 3B, 3C) of the cable (3) in a cryogenic fluid. The internal envelope (2) has, for each phase conductor (3A, 3B, 3C), one first electrical connector (6A, 6B, 6C) connected to the corresponding phase conductor (3A, 3B, 3C) and protruding from the internal envelope (2). The termination unit (1) further has an electrically conductive, grounded casing (7) surrounding the internal envelope (2) and the first electrical connectors (6A, 6B, 6C), the grounded casing (7) comprising one bushing (8A, 8B, 8C) for each one of the first electrical connectors (6A, 6B, 6C), each bushing (8A, 8B, 8C) being connected to one of the first electrical connectors (6A, 6B, 6C) by a second electrical connector (9A, 9B, 9C) and being adapted to transmit voltage and current from its associated phase conductor (3A, 3B, 3C).

12 Claims, 2 Drawing Sheets

TERMINATION UNIT FOR A SUPERCONDUCTING CABLE

RELATED APPLICATION

This application claims the benefit of priority from European Patent Application No. 15 305 338.4, filed on Mar. 5, 2015, the entirety of which is incorporated by reference.

BACKGROUND

Field of the Invention

The invention concerns a termination unit for a single- or multiphase superconducting cable.

Description of the Related Art

Single- or multiphase superconducting cables consist: of one or N concentrically arranged superconducting phase conductor(s) and an external neutral or screen conductor around a tubular or massive supporting core extending along a longitudinal axis, whereby all the superconducting phases as well as the outermost superconducting phase and the neutral conductor are separated from each other by an insulating layer. Each superconducting phase conductor may consist of multiple layers of superconducting wires or tapes, wherein an electrical insulation might be present in between the layers of one phase conductor. The cable is arranged within a thermally insulating envelope. The thermally insulating envelope as well as the tubular supporting core may contain a refrigerating fluid, such as liquid nitrogen. Generally, multiphase superconducting cables are three-phase cables (N=3). They are, for example, used as power cables installed in an electrical grid.

Termination units for single- or multiphase superconducting cables are needed in order to connect to cable to the grid, i.e., for managing the transition between the cooled, superconducting regime and the normally conducting regime at ambient temperature. An example of such a termination unit is described in the European patent application EP 2 523 290 A1. This termination unit comprises cylindrical modular elements, one for each phase, each modular element having an external thermally and electrically insulating envelope. The external envelopes contain portions of the superconducting cable, which themselves are contained in internal envelopes made from a thermally and electrically insulating material and filled with cooling fluid. Branch elements of the phases are arranged at the ends of the modular elements and directly connected to the cable portions, and only electrical connection elements, e.g. lugs, of the branch elements project from the modular elements.

However, such a termination design implies external electrical fields present at the outside of the termination unit. These external electrical fields are difficult to manage if the termination unit is to be used, for example, in a substation. Indeed, in this case, additional measures and costs have to be engaged in order to ensure the security of the operator.

WO 03/034447 A1 is concerned with a superconducting cable termination for a superconducting cable which is surrounded by a termination conduct. A cold section is part of the conduct which is filled with a coolant. The following section is a transition duct which is followed by an ambient temperature section. This section contains a gaseous coolant at conduct pressure and ambient temperature. Internal connections and external connections are located in the ambient section.

OBJECTS AND SUMMARY

The object of the present invention is to provide a compact and simple termination unit which allows an easy and safe access for the operating personnel.

Embodiments of the present invention provide a termination unit for a superconducting cable, the cable comprising at least one phase conductor, the termination unit comprising an internal electrically insulating envelope containing the at least one phase conductor of the cable in a cryogenic fluid, the internal envelope comprising, for each phase conductor, one first electrical connector connected to the corresponding phase conductor and protruding from the internal envelope. The termination unit further comprises an electrically conductive, grounded casing surrounding the internal envelope and the first electrical connectors, the grounded casing comprising one bushing for each one of the first electrical connectors, each bushing being connected to one of the first electrical connectors by a second electrical connector and being adapted to transmit voltage and current from its associated phase conductor.

The termination unit according to the invention is thus insulated all around except at the bushings where the conductors are fed through for connection to normally conducting components.

Preferably, the internal envelope comprises several modular elements, one modular element for each phase conductor, each modular element comprising the first electrical connector protruding from the modular element.

In some embodiments, the grounded casing comprises a plurality of casing segments, each casing segment comprising one of the bushings, and each casing segment being associated with one phase of the cable, wherein the casing segments are electrically connected to each other. Such a casing allows for an easy assembly of the termination unit.

The casing segments may be connected to each other by cryogenic conducting flanges.

Advantageously, each bushing comprises an electrical field management component. This allows for avoiding critical electrical field concentrations at the end of each phase conductor.

Preferably, each bushing comprises an encapsulated connector for connection to normally conducting components. Thanks to such a connector, the superconducting cable may be directly connected to normally conducting components of a standard grid at ambient temperature without the necessity to take supplementary safety measures. Such connectors advantageously comprise electrical field management components confining the electrical field within the connector such that no external electrical field is present. Thus, the termination unit is grounded in its entirety, presenting no risk or constraints to operating personnel.

Advantageously, the grounded casing is made of stainless steel.

In some embodiments, the second electrical connector is a plug connector. Such a connector allows for easy assembling of the unit. Alternatively, the second electrical connector is made of flexible conductive elements. For example, the second electrical connector may be made of a copper wire mesh. Flexible conductive elements may compensate for deformation due to possible temperature differences between the internal envelope and the casing.

Advantageously, the internal envelope is thermally insulating.

Preferably, the space between the grounded casing and the modular elements is evacuated.

The superconducting cable having a cryogenic envelope, this envelope is electrically connected to the grounded casing.

BRIEF DESCRIPTION OF THE DRAWINGS

Exemplary embodiments of the termination unit according to this disclosure are described with reference to the accompanying drawings, in which.

DETAILED DESCRIPTION

Figure 1:
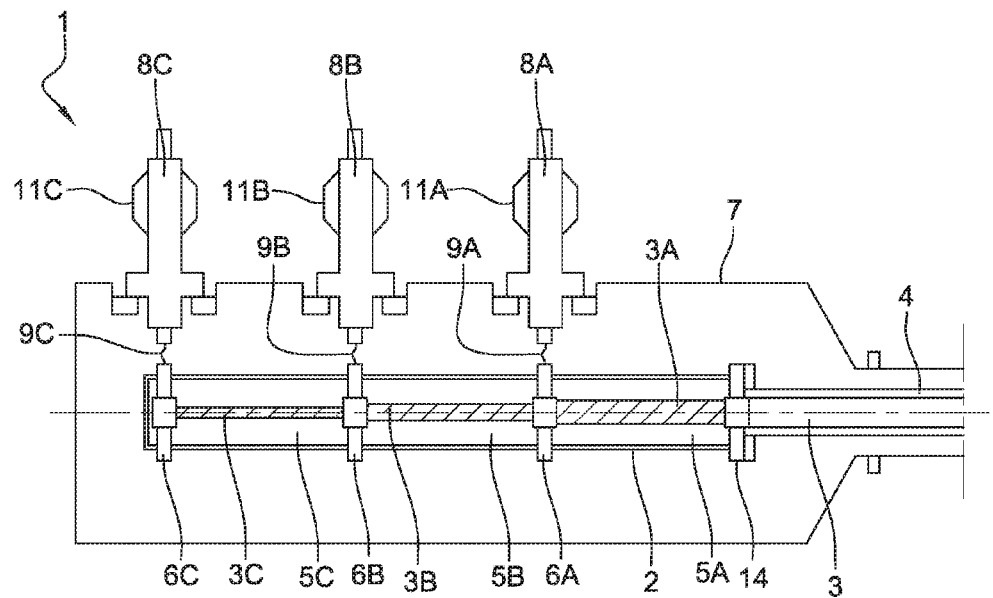
FIG. 1 schematically illustrates an embodiment of a termination unit according to the invention, FIG. 2 schematically illustrates a second embodiment of a termination unit according to the invention, and FIG. 3 schematically illustrates a third embodiment of a termination unit according to the invention.

The figures and the following description illustrate exemplary embodiments. In the figures, elements with similar structures and/or functions may be denoted by like reference numerals. In the following described embodiments of the invention, the superconducting cable is a three-phase cable.

FIG. 1 schematically shows an embodiment of the termination unit 1 according to the present disclosure. The termination unit 1 comprises an internal envelope 2 containing the end of the superconducting cable 3 and a cryogenic fluid. The three phase conductors 3A, 3B, 3C of the cable 3 are arranged concentrically and are bared within the internal envelope such that each phase conductor 3A, 3B, 3C has a contacting surface extending longitudinally and being exposed to the cryogenic fluid. The inner cryogenic envelope 4 of the cable 3 is connected to the internal envelope 2 and tightly sealed to it by means of a cryogenic flange 14.

The internal envelope 2 is made of an electrically insulating material. Preferably, the internal envelope 2 is made of a dielectric material, for example a polymer, such as a fiberglass laminate contained in an epoxy resin known as "G10". In the embodiments illustrated in FIG. 1-3, the internal envelope 2 comprises three modular elements 5A, 5B, 5C, each one being associated with one phase conductor 3A, 3B, 3C. The modular elements 5A, 5B, 5C are joined to each other in a media-tight manner, for example by means of flanges. Preferably, the internal envelope 2 is thermally insulating.

For each phase conductor 3A, 3B, 3C of the cable 3, the internal envelope 2 comprises an electrical connector 6A, 6B, 6C. This first electrical connector 6A, 6B, 6C is directly electrically connected to the corresponding phase 3A, 3B, 3C and protrudes from the internal envelope 2. The first electrical connectors 6A, 6B, 6C may, for example, have the form of a disc or a ring centered around the corresponding phase conductor 3A, 3B, 3C, which at least partly extends through the internal envelope 2 and allows for the passage of the cryogenic fluid. In the embodiments shown in the figures, where the internal envelope 2 comprises three modular elements 5A, 5B, 5C, each modular element 5A, 5B, 5C is associated with one first electrical connector 6A, 6B, 6C. In this case, the first connector 6A, 6B, 6C may be fixed by means of screws to the flanges of the modular elements 5A, 5B, 5C.

According to the invention, the termination unit 1 further comprises a grounded casing 7 made of electrically conductive material. This casing 7 may be made, for example, of stainless steel. The grounded casing 7 surrounds the internal envelope 2 and the first electrical connectors 6A, 6B, 6C with a distance to the internal envelope 2. The space between the grounded casing 7 and the internal envelope 2 is preferably evacuated to a sufficient vacuum level to guarantee the thermal and electrical insulation of the internal envelope 2. This space may be filled with appropriate material for thermal and electrical insulation, such as polyisocyanurate foam. The distance is also necessary to allow the electrical feedthroughs of the phase conductors 3A, 3B, 3C to be realized. The cryogenic envelope 4 of the cable 3 is electrically connected to the grounded casing 7. This is illustrated in the figures by reference The casing 7 comprises one bushing 8A, 8B, 8C for each one of the first electrical connectors 6A, 6B, 6C. The bushings 8A, 8B, 8C serve to transmit voltage and current from its associated phase conductor 3A, 3B, 3C out of the cryogenic part of the termination 1, i.e., the internal envelope 2, towards a standard, normally conducting network at ambient temperature.

Each bushing 8A, 8B, 8C is connected to one of the first electrical connectors 6A, 6B, 6C by a second electrical connector 9A, 9B, 9C. The second electrical connector 9A, 9B, 9C is preferably is made of flexible conductive elements. For example, the second electrical connector 9A, 9B, 9C may be made of a copper wire mesh. It may also be made of annealed copper parts or of other material parts, such as aluminum or brass. Such flexible conductors allow for the compensation of deformations due to temperature differences between the internal envelope 2 and the casing 7. Alternatively, the second electrical connector 9A, 9B, 9C may be a plug connector, such as a multi-contact lamella plug.

The superconducting cable also comprises a screen conductor (not shown). The screen conductor may be fed through the inner envelope and the grounded casing in the same way as the phase conductors, i.e., by means of a first and a second electrical connector and a bushing. This applies, in particular, if the screen conductor carries an important current.

Figure 2:
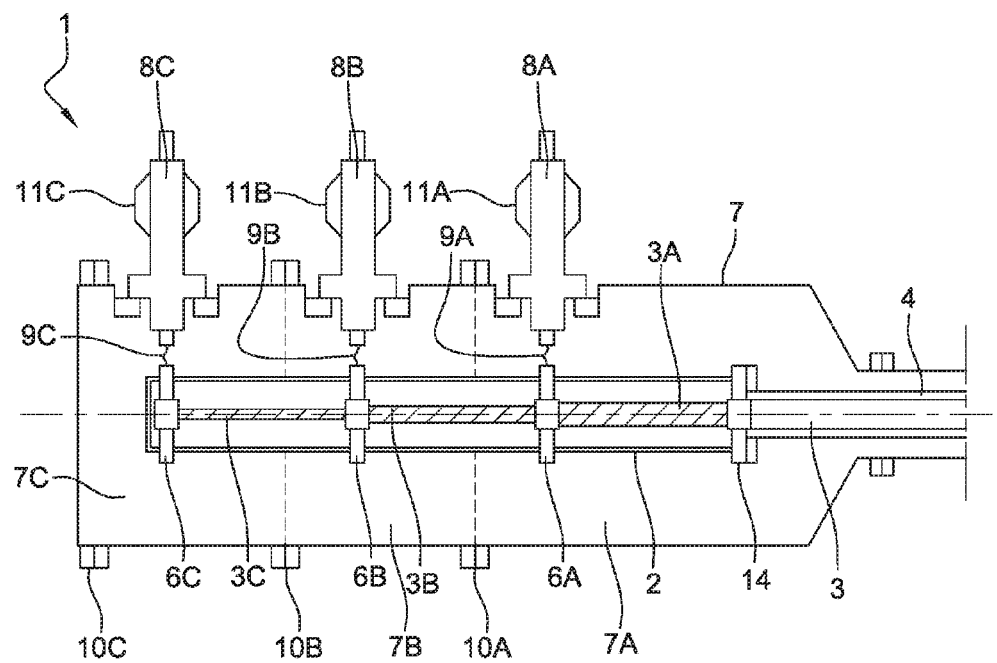
Figure 3:
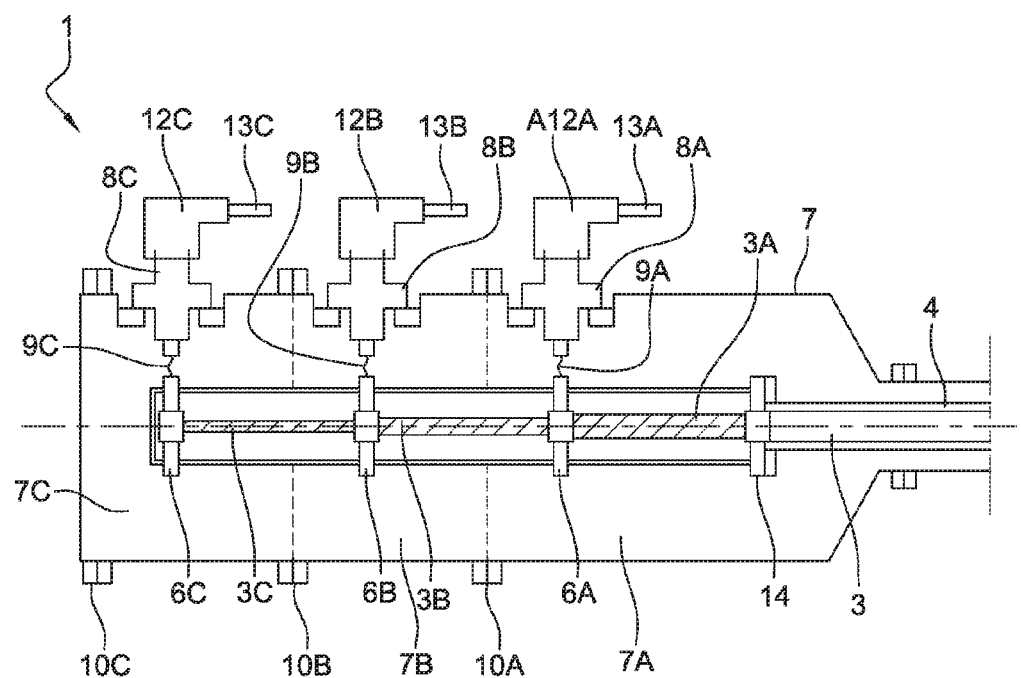

In the embodiments shown in FIGS. 2 and 3, the grounded casing 7 comprises a plurality of casing segments 7A, 7B, 7C. Each casing segment 7A, 7B, 7C comprises one of the bushings 8A, 8B, 8C. Each casing segment 7A, 7B, 7C is associated with one phase 3A, 3B, 3C of the cable 3, and the casing segments 7A, 7B, 7C are electrically connected to each other. They may, for example, be connected by cryogenic conducting flanges, as illustrated in FIGS. 2 and 3.

The bushings 8A, 8B, 8C may each comprise an electrical field management component 11A, 11B, 11C, as depicted in FIGS. 1 and 2. Such an electrical field management component 11A, 11B, 11C are used to avoid important potential gradients between the conductors protruding from the bushings 8A, 8B, 8C and the grounded casing 7 as well as any other external grounded parts. The field management component 11A, 11B, 11C may, for example, be a stress cone.

According to another preferred embodiment as illustrated in FIG. 3, each bushing 8A, 8B, 8C may comprise an encapsulated connector 12A, 12B, 12C. The encapsulated connectors 12A, 12B, 12C are arranged on top of the bushings 8A, 8B, 8C. With such encapsulated connectors, the termination unit 1 may be directly connected to a standard cable 13A, 13B, 13C at ambient temperature. The termination unit 1 is then fully insulated and safe from touch. Of course, the grounded casing 7 may be a single piece as shown in FIG. 1 or comprise a plurality of casing segments as depicted in FIGS. 2 and 3. Encapsulated connectors typically include an electrical field management component such that no external electrical field is present at the termination unit 1, thereby eliminating all risks and constraints linked to electrical fields, for example, for works in a substation.

The invention claimed is:

1. A termination unit for a superconductive cable, the cable having at least one superconductive phase conductor, the termination unit comprising:

an internal electrically insulating envelope containing the at least one phase conductor of the cable in a cryogenic fluid, the internal envelope having, for each phase conductor, one first electrical connector connected to the corresponding phase conductor and protruding from the internal envelope to the outside, wherein the termination unit further comprises an electrically conductive, grounded casing surrounding the internal envelope and the first electrical connectors with a distance to the internal envelope, the grounded casing comprising one bushing for each one of the first electrical connectors, each bushing being connected to one of the first electrical connectors by a second electrical connector, and being adapted to transmit voltage and current from its associated phase conductor, the grounded casing surrounds the internal envelope with such a distance that the respective first electrical connectors, the bushings and the second electrical connectors are covered by the grounded casing, the second electrical connector passes through the wall of the casing and protrudes from the same to the outside, and the termination unit is grounded in its entirety by electrically connecting the grounded casing to a cryogenic envelope of the cable.

2. The termination unit according to claim 1, wherein the internal envelope comprises one modular element for each phase conductor, each modular element comprising the first electrical connector protruding from the modular element.

3. The termination unit according to claim 1, wherein the grounded casing comprises a plurality of casing segments, each casing segment comprising one of the bushings, and each casing segment being associated with one phase conductor of the cable, wherein the casing segments are electrically connected to each other.

4. The termination unit according to claim 3, wherein the casing segments are connected to each other by cryogenic conducting flanges.

5. The termination unit according to claim 1, wherein each bushing comprises an electrical field management component.

6. The termination unit according to claim 1, wherein each bushing comprises an encapsulated connector for connection to normally conducting components.

7. The termination unit according to claim 1, wherein the grounded casing is made of stainless steel.

8. The termination unit according to claim 1, wherein the second electrical connector is a plug connector.

9. The termination unit according to claim 1, wherein the second electrical connector is made of flexible conductive elements.

10. The termination unit according to claim 9, wherein the second electrical connector is made of a copper wire mesh.

11. The termination unit according to claim 1, wherein the internal envelope is thermally insulated.

12. The termination unit according to claim 1, wherein the space between the grounded casing and the internal envelope is evacuated.

* * * * *